United States Patent [19]

Krude

[11] Patent Number: 4,819,756

[45] Date of Patent: * Apr. 11, 1989

[54] INDEPENDENT WHEEL SUSPENSION SYSTEM USING THRUST BEARING CONSTANT VELOCITY UNIVERSAL DRIVE JOINTS, BENDING AND TORSIONAL MOTION RESISTANCE SUSPENSION MEMBERS AND A TRANSVERSELY PIVOTABLE DIFFERENTIAL

[75] Inventor: Werner Krude, Grosse Pointe Park, Mich.

[73] Assignee: GKN Automotive Inc., Auburn Hills, Mich.

[ * ] Notice: The portion of the term of this patent subsequent to Jul. 15, 2003 has been disclaimed.

[21] Appl. No.: 917,426

[22] Filed: Oct. 10, 1986

Related U.S. Application Data

[63] Continuation of Ser. No. 586,012, Mar. 5, 1984, Pat. No. 4,671,370.

[51] Int. Cl.[4] ............................................. B60K 20/00
[52] U.S. Cl. ................................... 180/73.3; 180/75
[58] Field of Search .................... 180/73.3, 73.4, 73.1, 180/73.5, 25; 280/701, 700, 690

[56] References Cited

U.S. PATENT DOCUMENTS

| | | | |
|---|---|---|---|
| 2,911,052 | 11/1959 | Olley | 180/73 |
| 4,081,049 | 3/1978 | Youmans | 180/43 C |
| 4,600,072 | 7/1986 | Krude | 180/73.3 |
| 4,669,571 | 6/1987 | Kurde | 180/73.3 |

FOREIGN PATENT DOCUMENTS

| | | | |
|---|---|---|---|
| 493316 | 4/1954 | Italy | 180/73.3 |
| 322109 | 7/1957 | Switzerland | 180/73.3 |

Primary Examiner—David M. Mitchell
Assistant Examiner—Ross Weaver
Attorney, Agent, or Firm—Remy J. VanOphem

[57] ABSTRACT

An independent wheel suspension system having a differential with an output axis therethrough, the differential being coupled to a transverse support tube pivotable about a transverse axis therethrough and by an inboard constant velocity universal joint to a wheel assembly, the wheel assembly being coupled by an arm to a torsion rod carried by the transverse support tube and pivotable about a swing axis through the inboard constant velocity universal joint, whereby the differential is adapted to pivot relative to each of the output, the transverse and the swing axes.

5 Claims, 2 Drawing Sheets

INDEPENDENT WHEEL SUSPENSION SYSTEM USING THRUST BEARING CONSTANT VELOCITY UNIVERSAL DRIVE JOINTS, BENDING AND TORSIONAL MOTION RESISTANCE SUSPENSION MEMBERS AND A TRANSVERSELY PIVOTABLE DIFFERENTIAL

This is a continuation of application Ser. No. 586,012, filed Mar. 5, 1984 now U.S. Pat. No. 4,671,370.

BACKGROUND OF THE INVENTION

Cross-Reference to Related Applications

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members"; now U.S. Pat. No. 4,611,681

U.S. Ser. No. 586,056, filed Mar. 5, 1984 entitled "Independent Wheel Suspension System Using Thrust Bearing Constant Velocity Universal Drive Joints As Suspension Members In Combination With A Single Prop Shaft Joint and A Transversely Pivotable Differential";

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber";

U.S. Ser. No. 586,022, filed Mar. 5, 1984 entitled "Independent Wheel Suspension System Using Constant Velocity Universal Joints In Combination With A Single Prop Shaft Joint And Mounted Differentials"; now U.S. Pat. No. 4,596,299.

U.S. Ser. No. 586,098, filed Mar. 5, 1984 entitled "Independent Wheel Suspension Using Thrust Bearing Constant Velocity Universal Drive Joints As Suspension Members In Combination With A Wheel Assembly: And Differential Coupled To Pivot About A Transverse Stabilizer"; now U.S. Pat. No. 4,600,072

U.S. Ser. No. 586,054, filed Mar. 5, 1984 entitled "Independent Wheel Surpeurise System having Differential Pivotable About Two Axes".

BACKGROUND OF THE INVENTION

1. Field of the Invention

The present invention pertains to independent wheel suspension systems, and more particularly, to independent wheel suspension systems and, wherein a constant velocity joint, as an indispensable component of the suspension system, is combined with a wheel motion resistance suspension assembly to provide a suspension system for a vehicle wherein the differential of the vehicle is pivotable about a first pivot axis established on the vehicle frame and a second pivot axis established on the suspension system.

2. DESCRIPTION OF THE PRIOR ART

The present invention has particular application to both front and rear wheel independent suspension systems wherein universal joints are used to transfer power from a power delivery unit, normally including an engine, transmission and a differential housing, through half-shaft drive axles to the driving wheels. As a vehicle moves along a road surface, the wheels naturally experience an up and down movement relative to the driving surface. This movement is referred to as jounce and rebound, and the road clearance of various vehicle components vary accordingly. If the wheels are allowed to move in a plane approximately normal to the driving surface, such up and down movements have heretofore required corresponding changes in the swing length between the wheel and the differential of the power delivery unit. Such changes in swing length are normally effected by allowing an axial adjustment either of a driving member relative to the wheels or of one member of a driving member relative to another. Because of the dynamic loads associated with these up and down movements of the wheel and the geometric movements of the suspension members as a result of the various load and road conditions experienced by the wheels of a vehicle, past suspension system design efforts have been directed toward completely isolating the drive system components from the suspension system components to prevent the application of suspension loads to the power delivery unit or torque translating drive components of a vehicle. As a result of this approach the structural design criteria of prior art vehicles is to limit the torque translating components of a vehicle to carry only torque loads to propel the vehicle and to design a separate suspension system to carry the loads associated with the up and down movement of the vehicle wheels as a result of load and/or road variations.

The foregoing jounce and rebound movements of the driving wheels relative to the road surface introduce lateral or axial thrust loads relative to the differential of the power delivery unit. The magnitude of such thrust loads is related to the transmitted torque and to road protuberances, cornering speeds, weight distribution, wheel camber, and load carried by the vehicle as well as other factors. Such axial thrust loads have been diverted from the torque translating driving joints by either suspension control members connecting the wheel assembly to other points on the chassis of the vehicle or by additional structure encasing either the torque translating half-shaft or driving joints.

Independent wheel suspension systems generally contemplate the use of two general types of universal driving joints: the Cardan-type joint and the constant velocity type joint. The Cardan-type joint consists of two yokes connected by a plain or rolling type bearing on the ends of a Cardan or cruciform-shaped cross. The cross consists of a block and two pins, one pin being smaller than the other and passing through it. Even though heat-treated alloy steels are used throughout, the small pin diameters limit the capacity of the joint to carry axial thrust loads because such axial thrust loads normally impose stresses on the pins which are multiples of the stresses associated with carrying normal driving torque. Moreover, the stresses deleteriously augment each other through vector addition. The deterrent to using a single Cardan-type joint in an independent rear suspension system, however, is the severe limitation on the allowable angle of articulation under high torque loads. This is because the velocity ratio of the speed of the driving to the driven shaft pulsates or "knuckles" with increasing amplitudes as the angular articulation between these shafts increases. The cyclic speed pulsations significantly increase as articulation between the driving and driven joint members increase. Such speed pulsations cause correspondingly higher dynamic stresses on the Cardan cross pins and corresponding vehicle vibration and noise as loads of any appreciable inertia are translated through the joint. The higher dynamic stresses wear the joint structure to degeneratively further increase the speed variations and further limit the ability of the Cardan joint to carry high torque loads. Moreover, under thrust loads, the normal manufacturing tolerance of a Hooke's joint or Cardan joint, by themselves, cause unacceptable vibrations.

To avoid the foregoing deleterious stress and load carrying consequences of Cardan-type universal joints, their use in vehicles is generally limited to applications where the normal angular articulation between the driving and driven members is substantially less than ten degrees, usually less than three degrees. Even then, as herein above set forth, other structure is provided to divert the axial thrust loads away from the Cardan-type universal joints. For example, British Pat. No. 765,659 discloses the use of a Cardan-type universal joint to carry just the driving torque. A spherical socket and a mating ball-shaped member are provided about the Cardan joint to divert the axial thrust loads away therefrom. The patent to Etnyre, U.S. Pat. No. 3,112,809, discloses the use of Cardan-type universal joints to couple the inboard and outboard ends of a live axle. Lateral forces on the wheel are disclosed as being resisted by the live axle and also by a cantilever leaf spring. The Cardan universal joints are disclosed as being capable of absorbing axial loads well in excess of those encountered under normal conditions, but such conditions are limited to use of the joints only as a drive member and not as a suspension member.

Being limited in their allowable articulation and not being able to carry axial thrust loads normally associated with an operating vehicle, Cardan-type universal joints are not used as a suspension member, thereby requiring other pivot points displaced outboard from such Cardan joint and additional suspension control members connected to such other pivot points to carry the axial thrust loads.

Constant velocity universal joints have heretofore been used with independent wheel suspension systems to avoid the debilitating effects of the foregoing cyclic speed variations of Cardan-type joints while permitting substantially greater articulation angles of the wheel with respect to the drive shaft or the drive shaft with respect to the differential of the power delivery unit. Constant velocity universal joints of the type that provide uniform velocity between the driving and driven members at any intersecting angle of the joint are shown in U.S. Pat. No. 2,046,584 to Rzeppa, U.S. Pat. No. 3,162,026 to Ritsema, and also commonly assigned U.S. Pat. Nos. 3,688,521, 3,928,985, 4,240,680 and 4,231,233, the specifications of which are hereby incorporated by reference. However, such known constant velocity universal joints have heretofore been used to carry just the driving torque transmitted through the spherical ball members of the joint. These balls ride in sets of opposing axial grooves formed on a partially-spherical inner joint member and on a partially-spherical outer joint member. Ball guide means, in the form of a cage, are positioned to capture and guide the balls through a homokinetic plane of rotation wherein the centers of the balls very nearly bisect the articulation angle between the spherical surfaces of the outer and inner joint members resulting in a constant velocity transmission of rotary motion. The ball cage normally consists of upper and lower partially-spherical surfaces guided, respectively, on the partially-spherical inner and outer surfaces of the joint members, but are designed to have radial clearances therebetween in order to ensure lubrication of the surfaces and thereby avoid excessive heat build up.

As explained more fully in the aforesaid U.S. Pat. No. 3,928,985, issued Dec. 30, 1975, when the connecting drive shafts transmit torque loads at an articulated angle, internally generated joint friction and joint geometry of such constant velocity universal joints cause the inner and outer joint members to shift with respect to each other to take up the aforementioned clearances. Balls in diametrically opposite sets of grooves are thrust in opposite directions, causing the cage to be somewhat tilted or skewed relative to the design. The forward and aft end portions of the upper and lower partially-spherical surfaces of the cage are tilted or skewed under torque transmitting loads and bear radially against the inner and outer spherical joint members. Such skewed contact between the inner and outer spherical surfaces of the cage with the respective inner and outer joint members is tolerated to avoid the undesirable friction effects of greater surface contacts with smaller clearances. The internally generated loads, as a result of torque transmission through the joint, have been observed to decrease from about a maximum of three hundred pounds per wheel, which occurs when maximum torque is transmitted at extreme articulation angles of the drive joints just before a vehicle begins to move.

In any event, the balls and axial grooves of the constant velocity universal joint have heretofore been used to translate the driving torque while the spherical portions of the inner and outer joint members experience the internally generated loads, such internally generated loads being carried either by direct contact between the inner and outer joint members or through the interposed spherical surfaces of the cage. As taught in U.S. Pat. No. 3,789,626, to Girguis, where one constant velocity universal joint was used as a fixed joint, as in the drive shaft of a rear drive motor vehicle, an object of such an application is to maintain the joint elements free of axial internal forces, even though the joint was constructed to absorb forces, at least those related to torque translation. In fact, the joint was designed to avoid transmitting axial forces through the control element. Therefore, when used at opposite ends of a driving half-shaft, one of such constant velocity universal joints has heretofore been of the axial slip or plunging variety, allowing axial movement of the driven joint with respect to the driving joint, and the constant velocity universal joint at the other end has been of the non-axial slip or fixed type not permitting such axial movement.

In any event, such constant velocity joints and the drive shaft that couple them have heretofore not been used to transmit anything more than torque loads, and the related internally generated axial loads. For example, U.S. Pat. No. 3,709,314, to Hickey, discloses the use of a Rzeppa or Bendix-Weiss type of constant velocity joint at both ends of each of two front-wheel drive shafts, and a Rzeppa type constant velocity joint is disclosed at both ends of each of two rear-wheel drive shafts. Hickey further discloses four suspension units of the type conventionally used to divert externally generated axial thrust loads away from the constant velocity universal joints. The suspension units are substantially similar, except for variations in torsion bar, shock absorber and linkage attachment points due to the location of the units, front to rear and side to side. Each typical suspension unit is disclosed as consisting of a conventional upper A-frame arm and lower A-frame arm.

These are connected to tubular frame members by means of multiple brackets permitting vertical swinging motion. The wishbone ends of the A-frame arms are shown pivotably connected forward and aft of the center of each wheel, and in no instance is any drive shaft shown or disclosed as being any part of the suspension system or being a part of a typical suspension unit. U.S. Pat. No. 3,625,300 to Barenyi, et al., discloses the suspension of an axle unit of a motor vehicle by a support member permitting pivoting of the wheel pair in relation to the vehicle superstructure about two mutually perpendicular essentially horizontal axes, but without allowing any relative movement about either axis between the wheels and the axle gear housing.

SUMMARY OF THE INVENTION

The present invention recognizes and utilizes the fact that once a constant velocity universal joint is used as one of an at least two part independent wheel suspension system, the second part may be coupled to the vehicle frame in a manner affording new and improved concepts for resisting wheel motion while also affording new and improved concepts for supporting a vehicle differential to increase road clearance and trunk space.

The present invention contemplates the use of a constant velocity universal joint at least at the inboard end of a wheel drive shaft so as to function as one essential and indispensable suspension or component part of an independent wheel suspension system pivotable about both the joint axis and the drive shaft axis. A second essential and indispensable suspension part of the independent wheel suspension system consists of a transverse support structure mounted to the vehicle frame so as to allow a transverse bending or pivoting motion about a transverse support axis defined therethrough. The second suspension part further includes wheel motion resistance means mounted to the transverse support structure and pivotable at the inboard constant velocity universal joint about a swing axis therethrough to allow longitudinal bending or pivoting. The second suspension part of the independent wheel suspension system resists both the transverse and longitudinal pivoting or bending motion about the respective transverse and swing axes.

In one embodiment of the invention, the wheel motion resistance means include a longitudinal torsion rod and a swing arm. The longitudinal torsion rod has a fixed end secured to the vehicle frame and a torsion end pivotably supported by the transverse support structure. The swing arm has a wheel end connected to the vehicle wheel and a torsion rod end pivotably attached to the transverse support structure. The swing arm and the longitudinal torsion rod cooperate to resist both the longitudinal bending motion about the swing axis and also the longitudinal bending motion about the transverse support axis.

A further feature of the present invention is the pivotal mounting of the vehicle differential to the transverse support structure by mounting means connected therebetween, thereby allowing the differential to pivot about the wheel drive axis as the axis of the transverse support structure moves up and down in response to movement of the vehicle frame while at the same time being able to pivot about the transverse support axis as the wheel drive axis moves up and down. Such mounting arrangement increases the road clearance and trunk space compared to conventionally-mounted differentials.

It is a primary object of the present invention to provide a new and improved independent wheel suspension system.

It is another primary object of the present invention to provide an independent wheel suspension system having at least two essential and indispensable parts, the first part having the wheel drive shaft and at least an inboard constant velocity universal joint capable of withstanding axial thrust loads along the wheel drive axis and the second part having motion resistance means for resisting motion about both a swing axis through the inboard constant velocity universal joint and also a transverse support axis.

It is another primary object of the present invention to provide an independent wheel suspension system having a differential pivotable about more than one axis.

It is another object of the present invention to provide an independent wheel suspension system of the foregoing type wherein the wheel motion resistance means includes a transverse support structure, torsion rod assembly, and swing arm means, the transverse support structure being pivotably mounted to the vehicle frame to define a transverse support axis, the torsion rod assembly having a torsion end pivotably supported by the transverse support structure, and the swing arm means coupling the vehicle wheel and the torsion end of the torsion rod assembly.

It is another object of the present invention to provide an independent wheel suspension system wherein the differential of the power delivery unit is mounted to the transverse support structure so as to be pivotable with respect to the wheel drive axis as well as the transverse support axis with motions of the vehicle frame about either the transverse or swing axes.

It is a further object of the present invention to provide an independent wheel suspension system of the foregoing type wherein the differential of the power delivery unit is suspended from the vehicle frame in a manner increasing road clearance while increasing available trunk volume.

It is a further object of the present invention to provide an independent wheel suspension system in which the differential of the power delivery unit is suspended about the transverse support axis and wheel drive axis so as to reduce the bend angle at the prop shaft joint.

It is a further object of the present invention to provide an independent wheel suspension system wherein simple spring systems can be used.

It is a further object of the present invention to provide an independent wheel suspension system to replace carriers that would otherwise be necessary to thereby reduce the unsprung mass and production costs.

It is a further object of the present invention to provide an independent wheel suspension system that forms a single assembly unit.

It is a further object of the present invention to provide an independent wheel suspension system that isolates and dampens noise, and reduces suspension harshness and vibrations related to the power delivery unit.

BRIEF DESCRIPTION OF THE DRAWINGS

These and other features and objects of the invention will become more apparent to those skilled in the art from the following detailed description of a preferred embodiment taken in conjunction with the drawings wherein.

DETAILED DESCRIPTION OF THE PREFERRED EMBODIMENT

Figure 2:
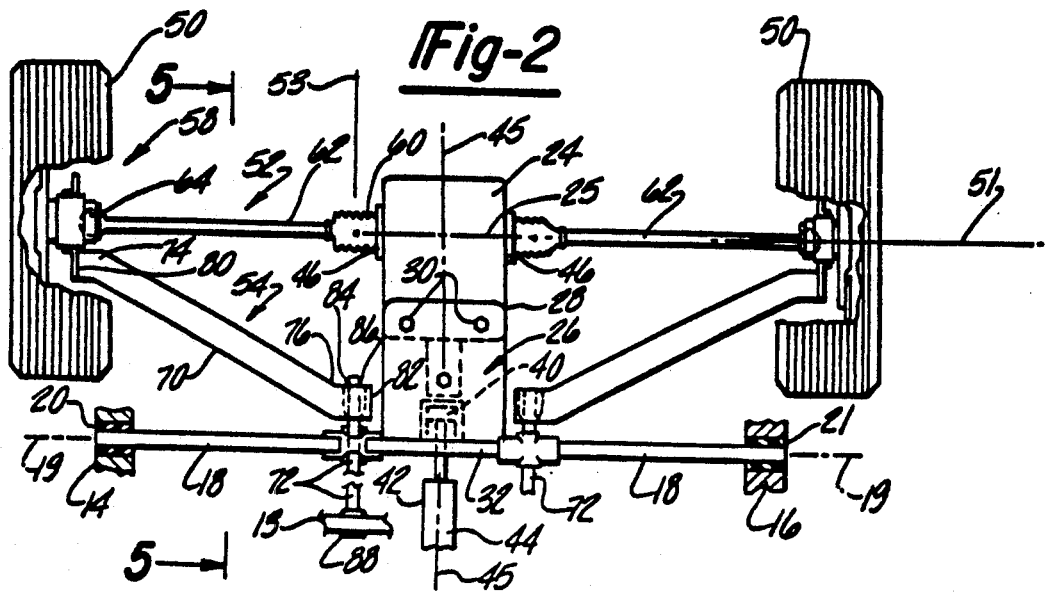
FIG. 2 is a plan view of an independent wheel suspension system provided in accordance with the present invention.

Referring now to the drawings, there is shown in FIGS. 1 through 7 a four-wheeled motor vehicle which includes a body 5 mounted to a chassis 10. The chassis 10 is supported in a known manner, such as by springs or shock absorbers (not shown), with respect to a chassis support means in the form of a vehicle frame 12 consisting of a first longitudinal frame member 14 and a second longitudinal frame member 16, and at least one transverse support member spaced therebetween and suitably affixed thereto. Chassis and/or chassis support means, as used herein, are intended to include a vehicle made of unitary construction wherein some of the chassis components are provided in the body of the vehicle. The transverse support member is shown in the form of a transverse tube 18, as shown in FIG. 2, the outboard ends of which are rotatably supported by bushings 20 and 21 carried by the first and second longitudinal frame members, 14 and 16 respectively, so as to permit a rotatable motion about a transverse axis 19 coaxial with the axis of the transverse tube 18.

Figure 5:
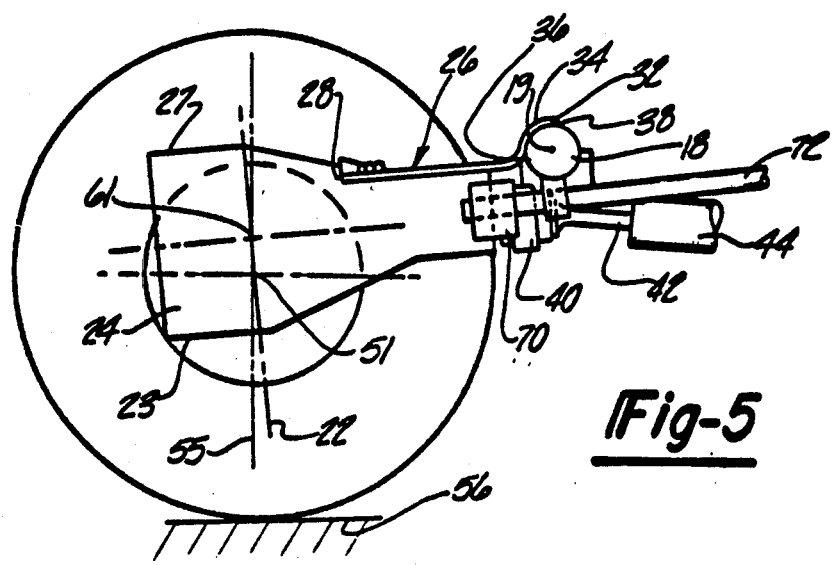
FIG. 5 is a side view taken along line 5—5 of FIG. 3.

A differential 24 of a power delivery unit is suspended from the transverse tube 18 by differential mounting means in the form of a mounting plate 26 having a rear end 28 secured to the differential 24 by suitable means, such as bolts 30. The front end 32 of the differential mounting plate 26 terminates in a partly curved lip 34 suitably affixed to the periphery 36 of the transverse tube 18 by suitable known means such as welds 38, as shown in FIG. 5. Coupled to the input end of the differential 24 by a universal coupling such as a Hooke's or Cardan joint 40 is the drive end 42 of a prop shaft 44, as better seen in FIGS. 5 and 6, the prop shaft 44, in turn, being coupled by another universal joint 47 to a source of drive power, such as an internal combustion engine (not shown). The prop shaft 44 operates in a known manner to translate driving torque about a prop shaft axis 45, located intermediate the first and second longitudinal frame members 14 and 16, from the engine to the differential 24, which redirects such driving torque to the lateral half-shaft assemblies about a respective differential output axis 25

As more fully set forth in copending patent application Ser. No. 586,086, the specification of which is hereby incorporated herein by reference, the vehicle further includes an independent wheel suspension system for each driving wheel assembly 58. Each such independent wheel suspension system consists of at least a first suspension part 52 and a second suspension part 54 for independently suspending each driving wheel assembly 58 with respect to a driving surface 56 through a respective wheel assembly. Each such first suspension part 52 has an inboard constant velocity universal joint 60 coupled by a half shaft or drive shaft 62 to an outboard constant velocity universal joint 64. The inboard constant velocity universal joint 60 is mounted to a lateral side of the differential 24 by suitable mounting studs 46, and the outboard constant velocity universal joint 64 is mounted to the wheel assembly 58 for rotatably driving the driving wheels 50 about a wheel axis 51, as shown in greater detail in U.S. Pat. No. 4,231,233, issued Nov. 4, 1980, the specification of which is hereby incorporated herein by reference.

Figure 1:
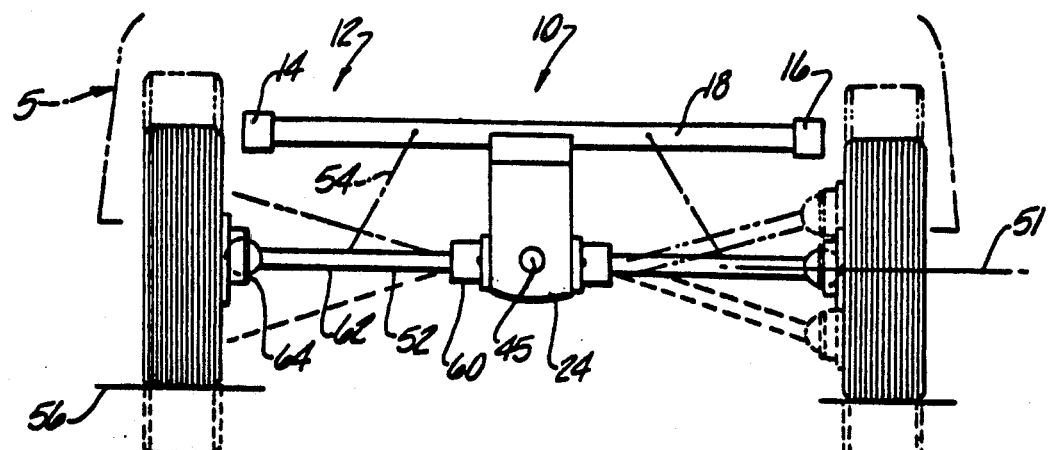
FIG. 1 is a schematic view of an independent wheel suspension system including at least two suspension parts, the first part of which includes constant velocity universal joints at both the inboard and outboard ends of the drive shaft connecting the power delivery unit to the driving wheels and the second part of which includes vehicle motion resistance means coupling each wheel to the vehicle frame.
Figure 4:
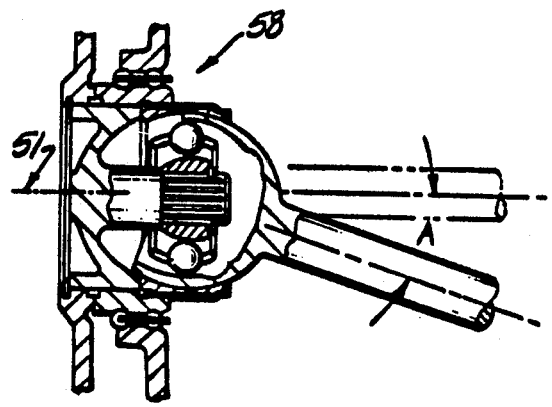
FIG. 4 is a view, partly in cross-section, of one type of constant velocity universal joint suitable for use as the first part of the independent wheel suspension system.

Each inboard and outboard constant velocity universal joint 60 and 64 is preferably of the fixed, or non-axial movement type, as shown in greater detail in FIG. 4, and includes an inner and an outer joint member coupling respective shafts having therebetween an angular intersection A, also known as the articulation angle. The articulation of the assembly is normally on the order of three to six degrees when the vehicle is at rest, but under full load of the vehicle, as well as conditions of wheel jounce and rebound, may be on the order of ten to fifteen degrees or more.

In certain applications, one or both of the inboard and outboard constant velocity universal joints 60 and 64 may also be of the axially plunging, telescoping, or splined types, such as those shown in U.S. Pat. No. 3,688,521, to Smith, et al., issued Sept. 5, 1972, the specification of which is hereby incorporated herein by reference, as long as such type, at either end of their axial travel, function as a suspension part of the independent wheel suspension system in the same manner as a fixed constant velocity universal joint. Moreover, some applications may require that only the inboard joint be of the constant velocity universal type, the outboard coupling being of another type, universal or otherwise.

Figure 3:
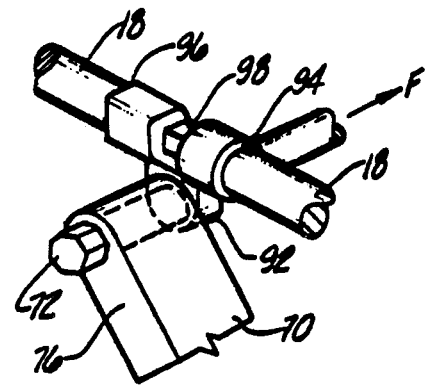
FIG. 3 is a view, partially isometric and partially in cross-section, of a bushing coupling the transverse tube, torsion rod, and swing arm in accordance with the present invention.

Each second suspension part 54 includes a wheel motion resistance assembly in the form of a swing arm 70, and a torsion rod 72 cooperating with the transverse tube 18. Each swing arm 70 has a wheel end 74 and a torsion rod end 76. The wheel end 74 is pivotably connected to the wheel assembly 58 such as by a pivot knuckle 80, and the torsion rod end 76 has an axial length section 82 with a hexagonally-shaped socket 84 therein for capturing a hexagonally-shaped end 86 of the torsion rod 72. The other end of the torsion rod 72 is suitably captured and secured both axially and circumferentially to a forward frame end 13 of the vehicle frame 12 in a suitable known manner, such as by another hexagonally-shaped socket and bolt arrangement 88. As best seen in FIG. 3, each torsion rod 72 is pivotally journalled in an annular rod bushing 92 suitably fixed to the transverse tube 18 such as by mounting grommets 94 and 96 having flats 98 to prevent circumferential slippage. The first and second suspension parts 52 and 54 swing, or pivot, about a swing axis 53 developed by the longitudinal axis of the torsion rod being aligned with the homokinetic center of the inboard constant velocity universal joint 60. The first and second suspension parts 52 and 54 also pivot about the transverse axis 19. But the tendency to pivot about each of these axes is resisted and dampened by the foregoing wheel motion resistance assembly in a manner made more apparent from the following description of the operation.

OPERATION

Figure 6:
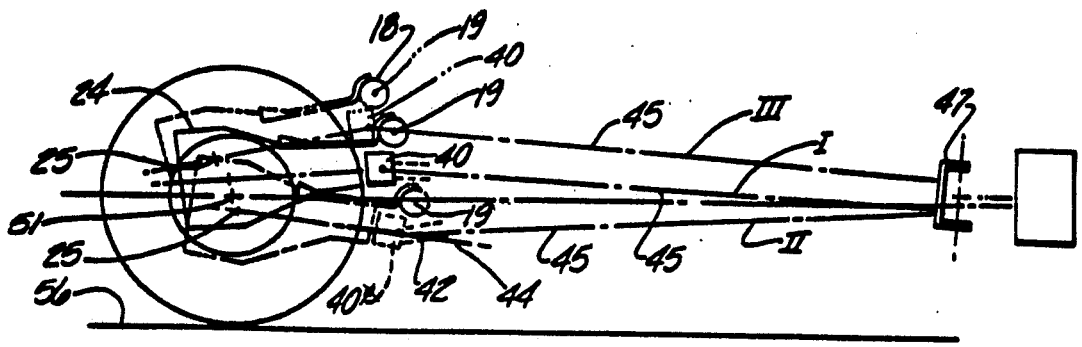
FIG. 6 is a diagrammatic side view of the independent wheel suspension system of the present invention positioned in a normal, fully loaded, and a totally unloaded position.

The operation of the independent wheel suspension system of the present invention may be better understood with reference to the three drive line positions shown in FIG. 6. Therein, position I represents the standard normal condition wherein the only load on the vehicle in addition to its weight, as delivered, is the average weight of an average driver. The prop shaft 44 has a slight upward inclination from the engine to the differential 24, and the differential 24 has a slight downward inclination rearwardly from the transverse axis 19 to the differential output axis 25. Position II represents the fully-loaded condition wherein the vehicle is loaded with the equivalent of five passengers in the passenger compartment and appropriate weights of three hundred pounds in the trunk. Position III represents the standard unloaded condition in which the vehicle frame is raised from the ground until the wheels just lift off or freewheel. The independent wheel suspension system is designed so that all other normal conditions, including jounce, rebound and cornering, effect positions intermediate positions I, II, and III.

Figure 7:
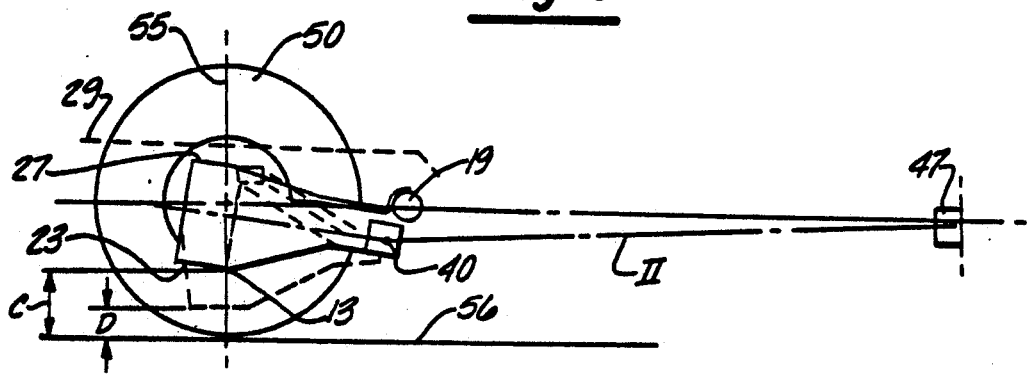
FIG. 7 is a diagrammatic side view of the independent wheel suspension system provided in accordance with the present invention showing the increased ground clearance afforded thereby with respect to a conventional independent wheel suspension system.

In obtaining the fully loaded position II, the vehicle frame 12 and the transverse tube 18 are moved downwardly toward the road surface 56, into the plane of the paper as viewed in FIG. 2, or downwardly in a direction toward the road surface 56 illustrated in FIGS. 5 through 7. Assuming there is no jounce or rebound of a driving wheel 50 relative to the driving surface 56, each driving wheel 50 tends to swing upward relative to the vehicle frame 12 about both the transverse axis 19 and the swing axis 53. But, this motion is resisted and dampened by the torsion rod 72 through the swing arm 70. The upward movement about the swing axis 53 is resisted by the torsional stiffness of each torsion rod 72 and the upward movement about the transverse axis 19 is resisted by the longitudinal bending stiffness of each torsion rod 72.

Because the differential is pivotable about the transverse axis 19, as well as about the differential output axis 25, the differential 24 moves downward relative to the driving surface 56 by a designed proportion, preferably less than one third of the downward movement of the vehicle frame 12 at the transverse tube 18 relative to the driving surface 56. The exact differential-to-frame movement ratio is determined by various parameters including desired spring rates, normal and extreme angles of articulation, lateral axial loading through the inboard constant velocity universal Joint, the length of the swing arm 70, desired trunk volume and, of course, desired minimum road clearance. For example, if designed to normally effect a slight downward or articulation of at least three degrees from each inboard constant velocity universal joint 60 out to each driving wheel 50, the driving wheel 50 will normally exert an upward axial force on the inboard constant velocity universal joint 60 through the drive shaft 62. Such upward force tends to maintain the prop shaft center of the differential 24 in its normal position I even though the forward end of the differential 24 pivots downwards, clockwise in FIG. 6, about the wheel axis 51 as the forward end of the differential 24 follows the downward movement of the transverse tube 18.

As the vehicle travels down a flat driving surface 56, being normally loaded, such as with just a driver, the independent wheel suspension system is configured so that the differential output axis 25, which is coincident with the axis of the driving member of the inboard constant velocity universal joint 60, is located horizontally above the wheel axis 51 of the driving wheel 50, as shown in FIG. 5. This offset is effected by an upward articulation angle of three or four degrees between the inner and outer members of each constant velocity universal joint. Moreover, the suspension system is configured to afford a slight rearward tilting of the vertical axis 22 of the differential 24 counterclockwise, as viewed in FIG. 5, from the normal axis 55 to the driving surface 56. This slight rearward tilt of the vertical axis 22 of the differential 24 about the transverse axis 19 is increased, as better seen in FIG. 6, as the driving wheel 50 moves downward relative to the transverse tube 18, so that the differential 24 and the prop shaft 44 move toward the unloaded upward position III relative to the normal position I. For example, should the driving wheel 50 move downwards or into the plane of the paper as viewed in FIG. 2, such as by dropping into a road pothole, such downward movement would be resisted by the cooperation of the torsion rod 72 with the swing arm 70 about the swing axis 53. Moreover, such downward movement would also be resisted by the bending resistance about the transverse axis 19 imparted to the torsion rod end 76 of the swing arm 70 by the bending of the torsion rod 72.

The annular rod bushing 92 and the bushing cup transfer to the transverse tube 18 the longitudinal bending resistance of the torsion rod 72 to further restrain both the downward movement of the driving wheel 50 about the transverse axis 19 and also the downward movement of the differential 24 thereabout through the differential mounting plate 26 being attached to the transverse tube 18.

Conversely, when the wheel travels over a bump, the drive train assumes the fully loaded downward position II with respect to the normal position I wherein the vertical axis 22 of the differential 24 is pivoted forwardly through the normal axis 55 to the driving surface about the transverse axis 19 of the transverse tube 18.

As may be better understood with reference to FIG. 7, the foregoing independent wheel suspension system provides a road clearance C between the bottom edge 23 and the driving surface 56 when the driving wheels 50 go over a bump. Such clearance C has been determined to be at least twice the clearance D afforded between the conventional independent wheel suspension system and the driving surface 56. This large difference results from the fact that in a conventional independent wheel suspension system the differential is mounted directly to the frame rather than being pivotably connected thereto in accordance with the teachings of the present invention. In a conventional independent wheel suspension system, the differential is mounted directly to a rigid frame member and moves up and down therewith, reducing the normal ground clearance to D as the vehicle is loaded towards the fully loaded position II, or a wheel goes over a bump, or both. However, with the present invention, loading of the vehicle to the fully loaded position II results in a forward pivoting of the differential 24 about the transverse axis 19 and differential output axis 25 due to the forward bending movements about the transverse axis 19 of the transverse tube 18 imposed thereon by each driving wheel 50 through the swing arm 70.

Even though the differential 24 therefore swings about the transverse axis 19, the linear motion of the differential 24, relative to the driving surface 56, is only a predetermined portion of the linear motion of the frame 12 relative to the driving surface 56. Therefore, in addition to affording greater road clearance C, the independent wheel suspension system of the present invention also affords greater trunk clearance between the top 27 of the differential 24 and the bottom of the trunk 29 as well as narrower or smaller drive shaft tunnels (not shown).

While the wheel motion resistance means consisting of the second independent wheel suspension part 54 includes, in the preferred embodiment, a swing arm 70 and a longitudinal torsion rod 72, it will be apparent to those skilled in the art that other wheel motion resistance means may be employed as long as the differential 24 is allowed to pivot about the transverse axis 19 and the differential output axis 25. For example, the resistance to longitudinal bending provided by the torsion rods 72 could also be supplied by equivalent means, such as an hydraulic leveling and/or dampening device or coil spring acting at appropriate points of either the differential mounting plate 26 or the wheel assembly 58.

Moreover, it is also apparent that the swing arm 70 may be affixed to other portions of the torsion rod 72, such as forward of the transverse tube 18, as for example shown in copending application Ser. No. 586,056 (Attorney Docket No. NAE-116-A), the specification of which is hereby incorporated herein by reference. Moreover, as will also be apparent to those skilled in the art, the motion resistance means may also include various combinations of helical springs, leaf springs, shock absorbers and other known suspension devices.

Although the best mode contemplated for carrying out the present invention as of the filing date hereof has been shown and described herein, it will be apparent to those skilled in the art that various modifications and variations may be made without departing from what is regarded as the scope of the invention.

What is claimed is:

1. An independent wheel suspension for a wheel assembly of a vehicle having support means for supporting a vehicle chassis comprising:

transverse support means pivotably mounted to said vehicle support means so as to allow a pivoting about a transverse support axis defined therethrough;

power delivery means defining a longitudinal power delivery axis therethrough, said power delivery means being fixedly mounted to said transverse support means to allow pivoting therewith about said transverse axis and defining a drive axis extending transversely therethrough spaced rearward of and substantially parallel to said transverse support axis by a drive axis offset;

an inboard universal joint mounted to a lateral side of said power delivery means along said drive axis to define a swing axis substantially parallel to and at a lateral offset from said longitudinal power delivery axis;

an outboard universal joint mounted to said wheel assembly;

drive shaft means coupling said inboard and outboard universal joints to define a swing length therebetween for carrying both driving torque and axial thrust loads therebetween while also allowing said wheel assembly to swing at said swing length about said swing axis; and wheel motion resistance means coupled to said wheel assembly and said transverse support means for resisting movement of said wheel assembly relative to said vehicle support means about both said swing axis and said transverse support axis;

whereby said inboard and outboard universal joints permit a drive axis pivoting of said power delivery means about said drive axis as said wheel motion resistance means moves about one of said swing axis and said transverse support axis.

2. The independent wheel suspension system of claim 1, wherein one joint of said inboard and outboard universal joints is a constant velocity joint.

3. The independent wheel suspension system of claim 2, wherein said one joint is a fixed constant velocity joint.

4. The independent wheel suspension system of claim 1, wherein said wheel motion resistance means comprises torsion resistance means secured to said vehicle support means and said transverse support means so as to resist said motion about said swing axis.

5. The independent wheel suspension system of claim 1, wherein said wheel motion resistance means comprises one resistance means of a torsion resistance means and an arm means for resisting motion about one axis of said swing axis and said transverse support axis.

* * * * *

UNITED STATES PATENT AND TRADEMARK OFFICE
CERTIFICATE OF CORRECTION

PATENT NO. : 4,819,756

DATED : April 11, 1989

INVENTOR(S) : Werner Krude

It is certified that error appears in the above-identified patent and that said Letters Patent is hereby corrected as shown below:

Column 1, line 20, after "members" delete the semi-colon ":" and insert comma ---- , ----, same line, after 4,611,681 insert a semi-colon ---- : ----.

Column 1, line 34, after "Differentials" delete the semi-colon ":" and insert a comma ---- , ----.

Column 1, line 35, after "4,596,299" delete the period "." and insert a semi-colon ---- : ----.

Column 1, line 40, after "Assembly" delete the colon ":".

Column 1, line 41, after "Stabilizer" delete the semi-colon ":" and insert a comma ---- , ----, same line, after "4,600,072" insert a semi-colon ---- : ----.

Column 1, line 43, delete "Surpeurise" and insert ---- Suspension ----, same line after "having" insert ---- a ----.

Column 2, line 55, after "The" insert ---- major ----.

UNITED STATES PATENT AND TRADEMARK OFFICE
CERTIFICATE OF CORRECTION

PATENT NO. : 4,819,756
DATED : April 11, 1989
INVENTOR(S) : Werner Krude

It is certified that error appears in the above-identified patent and that said Letters Patent is hereby corrected as shown below:

Column 7, line 18, delete "FIG. 3" and insert ---- FIG. 2 ----.

Column 7, line 29, delete " PRE-FERRED" and insert ---- PREFERRED ----.

Column 8, line 42, after "as" (second occurrence) insert ---- the universal joint of any ----.

Column 8, line 3, after "25" insert a period ---- . ----.

Column 9, line 58, delete "Joint" and insert ---- joint ----.

Column 11, line 7, after "2" insert a comma ---- , ----.

Column 11, line 7, after "therefore" insert a comma ---- , ----.

Signed and Sealed this

Third Day of April, 1990

Attest:

HARRY F. MANBECK, JR.

*Attesting Officer*  *Commissioner of Patents and Trademarks*